Nov. 24, 1959    H. BLACKSTONE    2,914,608
SCANNING MECHANISM
Filed March 2, 1953

INVENTOR.
HENRY BLACKSTONE
BY
Mitchell + Bechert
ATTORNEYS

# United States Patent Office 2,914,608
Patented Nov. 24, 1959

2,914,608

SCANNING MECHANISM

Henry Blackstone, Northport, N.Y., assignor to Servo Corporation of America, New Hyde Park, N.Y., a corporation of New York Application March 2, 1953, Serial No. 339,701

14 Claims. (Cl. 178—6.8)

My invention relates to an improved optical-scanning means and to radiation-responsive means utilizing such optical scanning. The present application incorporates certain specialized refinements and improvements over the invention disclosed in the copending patent application of Henry Blackstone and Frank G. Willey, Serial No. 320,272, filed November 13, 1952.

It is an object of the invention to provide improved optical-scanning means of the character indicated.

It is another object to provide improved means for continuously and automatically scanning a field of view for varying energy levels in such field.

It is a further object to provide improved display means for scanning means of the character indicated.

It is a specific object to meet the above objects with a mechanism which may make a single-shot exposure over a field of view and which will operate automatically and with simple controls for the full duration of such exposure.

Another specific object is to provide simplified recycling means for a single-shot exposing device of the character indicated.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Figure 1:
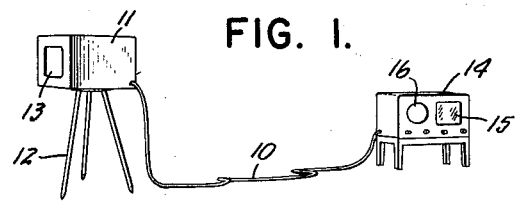
Fig. 1 is a simplified view in perspective illustrating major elements of a scanning device incorporating features of the invention.

Briefly stated, my invention contemplates what might be termed a camera analog of a scanning system of the general character set forth in the above-identified copending patent application. The invention may therefore be useful in a ground-based observation of a temperature or the like profile of a surface or area constituting the field of view; the meaning of the profile or picture will depend on the spectral response of the detector—for example, when using a so-called thermistor bolometer as the detector, the profile may appear as a two-dimensional intensity-modulated plot representing the relative location and relative intensity of heat sources (including low-heat sources) in the field of view.

The basic scanning means may comprise energy-responsive means fixedly carried by a support; collecting optics focused on the energy-responsive means may be journalled for rotation on the support. The support itself is mounted for what may be termed scan-depression movement with respect to a frame, and means coordinated with the scan-depression movement may determine limits of operation of signal-processing means for the output of the energy-responsive means, thereby determining limits of a single shot exposure over a scanned two-dimensional field of view.

Throughout the specification reference will be made to the movement of the support with respect to the frame as a scan-depression movement, but it will be understood that these words do not necessarily limit the desired or preferred movement of the support. For example, in certain cases it may be desirable that the "scan-depression movement" involve for each exposure an upward progression about a horizontal axis. Alternatively, a right-to-left or left-to-right movement may be involved about a vertical axis. In any case, the motion will be understood to be about an axis generally transverse to the scanning axis and to be adequately described by the term "scan-depression."

Referring to the drawings, my invention is shown in application to a device incorporating two units which may, for convenience, be mounted at two spaced locations and interconnected by flexible means 10. Thus, a scanner unit 11 may be mounted on a tripod 12 with its viewing aperture 13 facing the subject matter or field to be scanned; signal-processing means for the energy detected in the scanner of unit 11 may be largely contained in a separate cabinet unit 14 including, if desired, a panel 15 at which a recording chart may display a permanent record of scanned information, and a cathode-ray display device 16 for more transient examination of the exposure.

The scanning means may comprise energy-responsive or detector means 17, such as a photocell, bolometer, or the like, depending upon the energy spectrum of interest, and fixedly carried as by a standard 18 mounted on support means 19. The support means 19 in turn may be movably mounted with respect to the frame or cabinet 11, and I have suggested in the drawing that the support 19 may be pivotly mounted on shaft means 20—20', journalled as at 21 in side walls of the cabinet 11. The scanning means may include one or more objective elements such as lenses, carried for rotation about an axis transverse to the axis of shaft means 20—20', but I have shown such objectives to include a plurality of spaced mirrors 22—23—24, focused at a common point on detector means 17, which happens to be shown mounted on the scanning axis and in the plane defined by the optical axis of the mirrors. The mirrors 22—23—24 may be equally spaced about the scanning axis to define a generally cylindrical drum, and this spacing preferably equals the width of the mirrors.

The ring 25 will be understood schematically to designate bearing means for supporting one end of the scanning drum, as against a bearing or guide member 25' on support means 19; at the other end of the scanner, similar support means 26 may include a toothed periphery to permit motor drive, as by means 27 mounted on a bracket 28 forming part of the support means 19.

Signal-processing means responsive to the output of the energy-responsive means 17 may include a pre-amplifier 30 mounted directly at the base of standard 18 and on the support means 19. Signals may thus be elevated to a level permitting ready transmission by line 10 to suitable further amplifying means 31—32 in the cabinet 14. For display on the cathode-ray tube 16, the output of amplifier 31 may provide direct intensity-modulation, and a horizontal-sweep generator 33 may be synchronized with rotation of the drive motor 27 to generate the horizontal-sweep signals, the sweep rate being the number of mirrors (3) times the speed of the scanner drum.

If a moving-film camera is to record a succession of horizontal sweeps on the tube 16, then no vertical sweep is necessary, because the total "picture" development will be the result of coordinated movement of the camera film with succeeding sweeps. However, in the form shown, I illustrate the employment of a vertical sweep as generated by means 34 coordinated with the rotation of the scan-depression shaft 20. Thus, if the persistence of the viewing screen at tube 16 is of sufficient duration, there may be a fully developed field image on tube 16, as when making a trial exposure.

It is inherent in the described scanner that one half the scanning time cannot be utilized by any single sensitive element at 17. This results from the need to bring each optical system 22—23—24 successively into and out of the scanning field, and the time thereby necessarily taken. During this waste period, which occurs between each succeeding optical sweep, signals from detector 17 will be spurious, and resort should be made to shutter means (as at detector 17, but not shown), or to synchronized blanking means (as disclosed in the said copending application), or to other means to avoid presentations of the spurious signals. In the form shown, I employ a mask 16' set over the face of tube 16 and of a size to mask video traces from all but the desired signals, thus presenting only the desired rectangular field.

Ordinarily, I prefer that permanent records be made of the field scanned by the means thus far described, and for this purpose I illustrate a stylus-operated moving-strip recorder including take-up and supply reels 35—36 for electrically sensitive recording paper, film, or the like 42, to be advanced over a platen 37. On the other side of the paper 42, a stylus 38 may be driven transversely of the paper advance and in synchronism with the scanning movement of the optics. The stylus 38 is shown to be carried at one point along a flexible conductive loop stretched over spaced pulleys 39—40, and if desired, other styli 38'—38'' may also be carried by the stylus loop, at equally spaced locations. Signals from amplifier 32 are fed to the stylus 38 through brush or slip-ring means 41 and via the drive shaft for pulley 39. Recordings are made upon discharge through the sensitive paper, or the like 42 to the platen 37, which is shown grounded. Spurious signals may be eliminated during successive "waste" periods by suitably proportioning the spacing between styli to the desired effective width of the recording paper 42, as by limiting the transverse conductive length of platen 37 (suggested by dotted outlines).

The parts thus far described will operate to produce a perfectly satisfactory record or "picture" of the energy collected through a scanned field of view as seen through the window 13 which is preferably of a size to permit inclusion of limiting rays for all extremes of the scanned field, and which is also, of course, of a material transparent to the radiation of interest. However, for added convenience I prefer that exposure be made as upon a simple manual initiating operation and that thereafter all functions be governed automatically. Thus, motor means 45 may, through reduction gearing 46—47, drive the scan-depression shaft 20 between fixed limits, as determined by limit-switch means 48—49. An arm 50 carried on the shaft 20 may contact one or the other of the limit-switch means 48—49 to determine limits of scan depression. In certain cases, it may be desirable to maintain a given relationship between the scan speed and the scan-depression rate, and I suggest at 45' that a synchronizing connection between drives 27—45 may produce this result.

Figure 3:
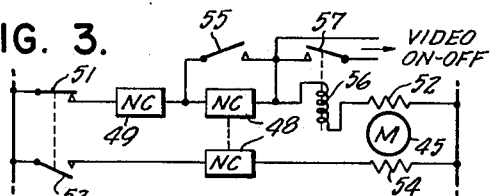
Fig. 3 is an electrical circuit diagram illustrating a control circuit employed in conjunction with elements of Fig. 2.

Referring to Fig. 3, it will be seen that the limit-switch means 48 may be of the double-pole variety, as suggested by the two circuits shown in Fig. 3 under the control of switch means 48; for the form shown, each pole is of the normally closed variety. Limit-switch means 49 may also be normally closed. Manual selector-switch means may include a first arm 51 connected in one circuit to determine the energizing of a winding 52 for forward (e.g. exposure) drive of the motor 45, and a second arm 53 ganged to the arm 51 may determine the energizing of a reverse winding 54 for motor 52. Thus, depending upon the setting of the switch means 51—53, which may involve a single manual operation as suggested in the drawing, the circuits may be conditioned for forward or reverse operation, corresponding to exposure and recycling of the described equipment. I ordinarily prefer that the switch means 51—53 be of the spring-operated type, requiring manual hold-in for the reverse condition, so that once the parts have been recycled, spring-operated means (not shown, but inherent in switch means 51—53) may recondition the circuits for exposure.

In order to initiate an exposure and, of course, once the scanning means is brought up to a steady continuous rotation of desired speed, a single manual switch 55 need only be depressed to complete the forward-drive circuit for motor 45. At the time switch 55 is closed, the parts may be in the relation shown in Fig. 2, with the arm 50 actuating the switch means 48 and, therefore, providing an opening in both circuits to motor 45. However, once the forward or exposure drive has been started, switch means 48 will no longer be actuated, so that it may return to its normally closed condition to hold-in the forward-drive circuit for motor 45.

In order that the signal-processing means may be caused to supply the display only during an exposure, I have shown relay means including a winding 56 in series with the forward-drive circuit, so that the normally open contact arm 57 thereof will only close a circuit when an exposure is being made. The circuit closed upon operation of relay 56 will be understood to provide a control function to the signal-processing means, and at 58 in Fig. 2 I suggest that this may be merely a video on-off bias control, as in amplifier 31. Thus, unless the motor means 45 is driven in a forward direction, and only when it is so driven, will there be any exposure and, therefore, display or recording.

At the end of scan depression for the exposure or forward drive, arm 50 will actuate switch means 49 to open the circuit to forward winding 52 of motor 45, thus terminating both the display and the scan-depression drive. If the forward-reverse switch means 51—53 should accidentally be left in the position shown, no further actuation of switch 55 will harm the equipment, because switch 49 will hold the forward-drive circuit open. However, upon shifting selector switch 51—53 to the reverse position, the circuit for reverse winding 54 will be closed and the circuit for forward winding 52 held open, while recycling takes place; recycling is complete when the parts reach the relation shown in Fig. 2, that is, when arm 50 strikes switch 48 and both forward and reverse circuits are thereby automatically opened.

Figure 2:
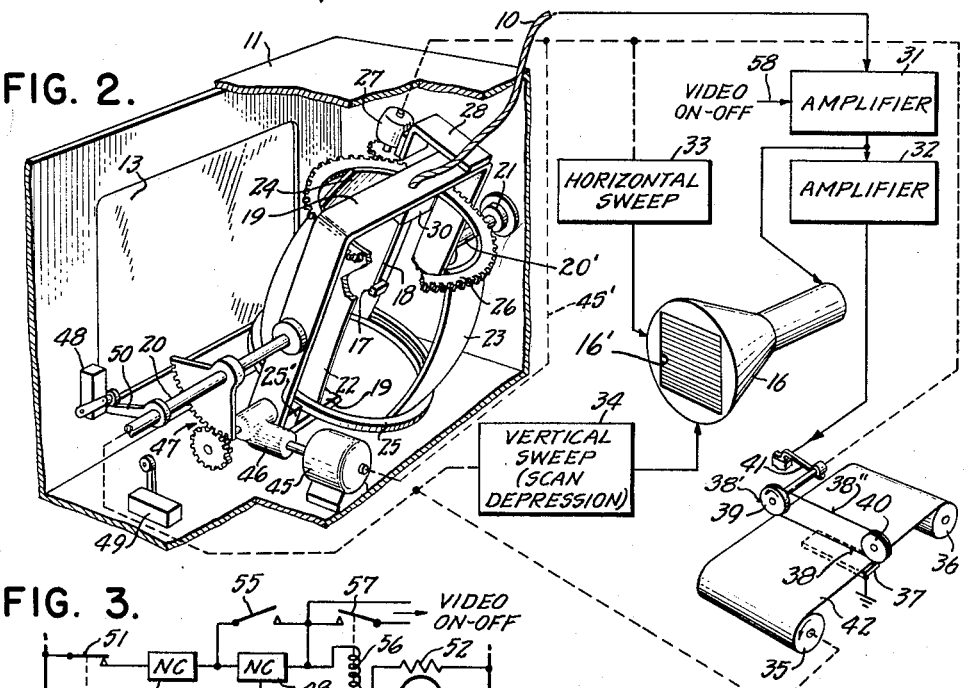
Fig. 2 is an enlarged view partly broken away and in perspective, and partly electrically schematic, to illustrate coordinated functioning in the device of Fig. 1.

As noted above, the basic scanning mechanism described in Fig. 2 has the inherent limitation that only 50 percent of the actual scanning time is utilizable to derive information for display. For most purposes, this limitation may not be consequential. However, as when it is necessary to make a faster exposure for coverage of the field of view, it may be desired to approach a 100-percent time-utilization of the scanning mechanism. Therefore, in Fig. 4 I illustrate a mechanism which may accomplish greater scanning efficiency.

Figure 4:
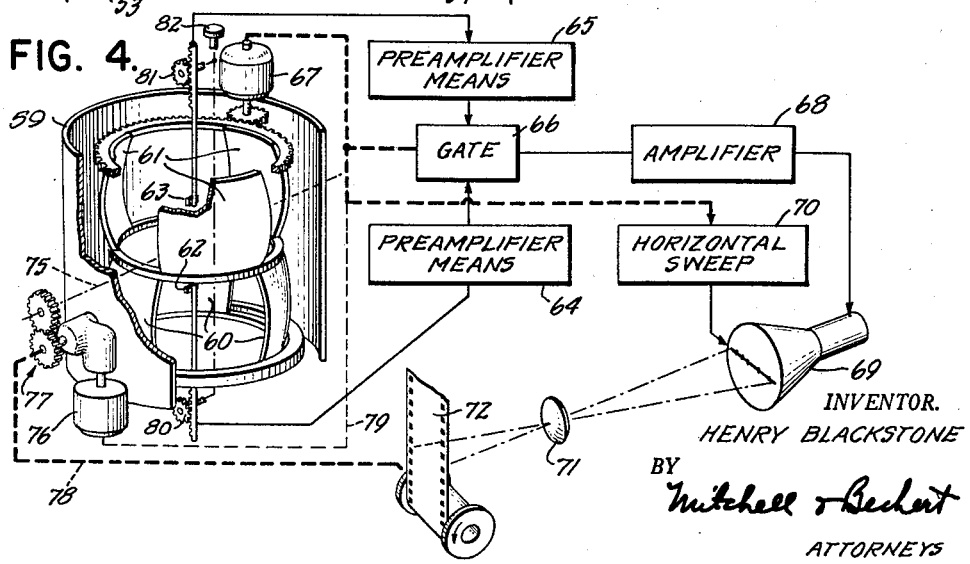
Fig. 4 is a view similar to Fig. 2, but illustrating a modification.

In the arrangement of Fig. 4, I actually employ two scanning optical systems, each of which happens to have an odd number of concave mirrors as the focusing elements. These systems are driven in synchronism, and they are shown mounted on the same rotating assembly, with the mirrors 60 of one system in angularly staggered relation with those 61 of the other system. Each system is shown to include its own separate non-rotated energy-responsive means 62—63 with individual pre-amplifier means 64—65. Shield means 59 may be non-rotatably supported on the same means (not shown) as that for the energy-responsive means 62—63 and may include a sufficient angular opening to define limits for the desired field of view. Gating means 66 operating in synchronism with the drive 67 for the rotating assembly provides a means for sampling the outputs of pre-amplifiers 64—65 in alternation and only for the periods in which these pre-amplifiers reflect the useful uniform response periods of the respective optical systems 60—61, as will be understood.

I have shown amplifier means 68 for treating the gated output and have applied signals thereby amplified as intensity modulations on a display tube 69, for which the horizontal-sweep circuit 70 may be synchronized with gate operation and with rotation of the scanning assembly. Permanent records may be available in accordance with the recording methods illustrated in Fig. 2, but in Fig. 4 I show optical means 71 for projecting the display images of tube 69 onto a moving recorder film or paper 72.

As in the case of Fig. 2, the scanning mechanism of Fig. 4 may be suspended by support means (not shown) for inclination about a scan-depression axis 75, as driven by motor means 76 and gear means 77, corresponding to that described at 45—46—47 in Fig. 2. For better-coordinated automatic operation, advance of the recorder film or paper 72 may be synchronized with scan-depression movement, as suggested by the line 78; also, for greater uniformity of development of any given exposure, synchronizing means 79 may establish a fixed relation between the speeds of the two motors 67—76. If desired, automatic control of the display elements of the signal-processing means may be effected in Fig. 4 by means completely analogous to that described in Fig. 2, so as to assure automatic sequencing of operations for a single-shot exposure.

In operation, for either of the described scanning configurations, it is not necessary to provide a geared or otherwise directly synchronized relationship between rotary drive of the scanning drum and drive to the scan-depression mechanism. This will apply if each of the energy-responsive means 17—62—63 comprises but a single sensitive element so as to constitute the basis for a single scanning spot in the field of view. If, as may in certain cases be desirable, the energy-responsive means 17, or 62—63, should comprise a plurality of separate elements, electronically commutated as disclosed in the said copending patent application, then, of course, each one of these elements for a particular energy-responsive means will constitute a different scanning spot across the field of view; for a perfect presentation or display, the lines resulting from this multiplicity of scanning spots should be evenly spaced. To assure this, the suggested synchronism at 45'—79 must exist between the scanning drive (as at 27 or 67) and the scan-depression drive (as at 45 or 76).

When employing the arrangement of Fig. 4 to scan objects at infinity, or effectively so, the energy-responsive means 62—63 need only be placed at the center of scan rotation and in the planes of the optical axes of their respective optical systems. Thus, for such conditions, the axial spacing between the elements 62—63 is preferably coincident with the spacing between optical axes of the mirrors 60—61. This, of course, implies that for no scan depression and for objects at, or substantially at, infinity, the two scanning systems 60—61 will alternate in their coverage of the same line in the field of view. If it is desired that the two scanning systems shall alternate for scanning lines of given spacing, then the sensitive elements 62—63 may be eccentrically displaced with respect to the on-axis arrangement specified as preferred.

For coverage of fields at close range, of course, parallax will constitute a problem if the sensitive elements 62—63 are on the optical axes of mirrors 60—61, respectively, and if these optical axes are parallel. For special cases in which it is known what the focusing distance will be, it would certainly be possible to build the scanning drums 60—61 with a pre-set convergence of optical axes. However, for flexibility in use, I provide what may be termed rough-focusing means or parallax-correction means in the form of a differential axial adjustment in the relative positioning of the sensitive elements 62—63. Such adjustment may be made by first rack-and-pinion means 80 operative to displace the element 62; and, if desired, second rack-and-pinion means 81 may displace the sensitive element 63. A single manual adjustment knob 82 may control the desired relative displacement, and for small parallax corrections the resulting eccentric employment of the mirrors will be found not to introduce too substantial a degrading of optical quality.

It will be seen that I have described ingenious scanning and display mechanism which is, in effect, a spectrum-converter camera, the conversion being in each case from the spectrum to which the energy-responsive means is sensitive and to a visible display, either permanently on a recording film or the like, or transiently, as on the face of a cathode-ray tube. My camera is simple to operate and need involve but a single manual operation for each exposure. My device also lends itself to portable construction, so as to permit ready set-up wherever the exposure must be made.

While I have described the invention in detail for the preferred form shown, it will be understood that modifications may be made within the scope of the invention as defined in the claims which follow.

I claim:

1. An infrared scanning camera for producing a single-frame picture representing an infrared scanning of a field, comprising a frame, support means inclinable with respect to said frame about a scan-depression axis, scanning optics including a focusing element movably carried by said support means, relatively fixed infrared-responsive means at the focus of said optics, whereby said optics may image said infrared-responsive means in a field to be scanned, means for driving said focusing element for movement to cause said image to scan the field about an axis generally transverse to said scan-depression axis, whereby for a given angle of view about said generally transverse axis the image of said infrared-responsive element may be said to scan successive lines across said angle of view, means for driving said support means through a limited scan-depression movement between angularly spaced first and second limits, signal-processing means connected to said infrared-responsive means, means responsive to scan-depression movement in the direction from one to the other of said limits for effectively activating said signal-processing means, and means responsive to attainment of said other limit for effectively deactivating said signal-processing means.

2. An infrared scanning camera, comprising a housing having an infrared viewing opening on one side thereof, support means inclinable about a scan-depression axis in said housing, scanning optics including a mirror element movably carried by said support means, relatively fixed infrared energy-responsive means at the focus of said optics, said scanning optics being oriented within said housing to image said energy-responsive means through said opening, whereby said optics may image said energy-responsive means via said mirror element in a field to be scanned through said opening, means for driving said mirror element for movement to cause said image to scan the field about an axis generally transverse to said scan-depression axis, whereby for a given angle of view about said generally transverse axis the image of said energy-responsive element may be said to scan successive lines across said angle of view, means including limit-stop means for driving said support means about said scan-depression axis between fixed limits referenced to said housing whereby successively scanned lines may be spaced throughout a range of scan-depression between said limits, and cathode-ray display means intensity-modulated in accordance with the response of said energy-responsive means, said display means including two generally perpendicular deflection systems and sweep means therefor, means synchronizing the sweep of one of said deflection systems with the scan across said field and about said first axis, and means synchronizing the sweep of the other of said deflection systems with the progress of scan-depression between said limits, and means responsive to an actuation of said limit-stop means at one of said limits for effectively deactivating said display means.

3. An infrared scanning camera according to claim 2, in which said last-defined means includes means effectively deactivating said scan-depression drive means.

4. An infrared scanning camera for producing a single-frame picture representing an infrared scanning of a field, comprising a housing having an infrared-viewing opening on one side thereof, support means inclinable about a scan-depression axis in said housing, scanning optics including a mirror element movably carried by said support means, relatively fixed infrared-responsive means at the focus of said optics, said scanning optics being oriented within said housing to image said infrared-responsive means through said opening, whereby said optics may image said infrared-responsive means via said mirror element in a field to be scanned through said opening, means for driving said mirror element for movement to cause said image to scan the field about an axis generally transverse to said scan-depression axis, whereby for a given angle of view about said generally transverse axis the image of said infrared-responsive element may be said to scan successive lines across said angle of view, and means for driving said support means about said scan-depression axis between fixed limits referenced to said housing, whereby successively scanned lines may be spaced throughout a range of scan-depression between said limits, visual-display means including means connecting the same to the output of said infrared-responsive means and synchronized respectively with movement of said mirror and of said support means, and means responsive to completion of a single scan of said field for automatically effectively deactivating the connection between said infrared-responsive means and said display means.

5. An infrared scanning camera according to claim 4, in which said visual-display means includes an amplifier, and in which said last-defined means includes a gain-control connection to said amplifier.

6. An infrared scanning camera for producing a single-frame picture representing an infrared scanning of a field, comprising a housing having an infrared-viewing opening on one side thereof, support means inclinable about a scan-depression axis in said housing, scanning optics including a mirror element movably carried by said support means, relatively fixed infrared-responsive means at the focus of said optics, said scanning optics being oriented within said housing to image said infrared-responsive means through said opening, whereby said optics may image said infrared-responsive means via said mirror element in a field to be scanned through said opening, means for driving said mirror element for movement to cause said image to scan the field about an axis generally transverse to said scan-depression axis, whereby for a given angle of view about said generally transverse axis the image of said infrared-responsive element may be said to scan successive lines across said angle of view, means for driving said support means about said scan-depression axis between fixed limits referenced to said housing, whereby successively scanned lines may be spaced throughout a range of scan-depression between said limits, signal-processing means connected to the output of said infrared-responsive means, means for initiating a single direction of drive of said scan-depression means when in a first angular orientation relative to said housing, and automatic means responsive to a predetermined second angular orientation of said scan-depression means for effectively deactivating said signal-processing means.

7. An infrared scanning camera for producing a single-frame picture representing an infrared scanning of a field, comprising a housing having an infrared-viewing opening on one side thereof, support means inclinable about a scan-depression axis in said housing, scanning optics including a mirror element movably carried by said support means, relatively fixed infrared-responsive means at the focus of said optics, said scanning optics being oriented within said housing to image said infrared-responsive means through said opening, whereby said optics may image said infrared-responsive means via said mirror element in a field to be scanned through said opening, means for driving said mirror element for movement to cause said image to scan the field about an axis generally transverse to said scan-depression axis, whereby for a given angle of view about said generally transverse axis the image of said infrared-responsive element may be said to scan successive lines across said angle of view, means for driving said support means about said scan-depression axis between fixed limits referenced to said housing, whereby successively scanned lines may be spaced throughout a range of scan-depression between said limits, means for initiating a single direction of drive of said scan-depression means when in a first angular orientation relative to said housing, and automatic means responsive to a predetermined second angular orientation of said scan-depression means and effective to terminate further drive of said scan-depression means in said single direction.

8. An infrared scanning camera for producing a single-frame picture representing an infrared scanning of a field, comprising a frame, support means inclinable about a scan-depression axis on said frame, scanning optics including a mirror element movably carried by said support means, relatively fixed infrared-responsive means at the focus of said optics, whereby said optics may image said infrared-responsive means via said mirror element in a field to be scanned, means for driving said mirror element for movement to cause said image to scan the field about an axis generally transverse to said scan-depression axis, whereby for a given angle of view about said generally transverse axis the image of said infrared-responsive element may be said to scan successive lines across said angle of view, means for driving said support means through a limited scan-depression movement between angularly spaced first and second limits, signal-processing means connected to said infrared-responsive means, means responsive to scan-depression movement in a first direction between said limits for effectively activating said signal-processing means, and means responsive to the opposite direction of scan-depression movement between said limits for effectively deactivating said signal-processing means.

9. A scanning camera according to claim 8, in which said signal-processing means includes a recorder with means for advancing a strip of recording paper or the like, and means coordinating the movement of said paper or the like with that of said scan-depression means in said first direction of movement to the exclusion of said opposite direction of movement.

10. A scanning camera according to claim 8, in which said signal-processing means includes cathode-ray display means, and sweep means for said cathode-ray display means and synchronized with rotation of said scanner.

11. A scanning camera according to claim 10, in which said cathode-ray display means includes second sweep means characterized by a sweep axis normal to that of said first-mentioned sweep means, said second sweep means being synchronized with said scan-depression movement.

12. A camera according to claim 6, in which said last-defined means includes a limit switch.

13. A camera according to claim 6, and including reversing means for said scan-depression means, and means responsive to a reversed drive of said support means for maintaining the deactivated condition of said signal-processing means.

14. A camera according to claim 13, and including means responsive to re-attainment of said first angular orientation to terminate further drive of said scan-depression means in said reversed direction.

References Cited in the file of this patent

UNITED STATES PATENTS

| | | |
|---|---|---|
| 1,958,893 | Kintner | May 15, 1934 |
| 2,369,622 | Toulon | Feb. 13, 1945 |
| 2,419,024 | Iams | Apr. 15, 1947 |
| 2,477,307 | Mackta | July 26, 1949 |
| 2,570,251 | Lester | Oct. 9, 1951 |